United States Patent
Park et al.

(10) Patent No.: US 7,757,260 B2
(45) Date of Patent: Jul. 13, 2010

(54) METHOD OF MULTI-TASKING IN MOBILE TERMINAL

(75) Inventors: Dae-Gyue Park, Daegu (KR); Hyun-Wook Cho, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1094 days.

(21) Appl. No.: 10/993,002

(22) Filed: Nov. 18, 2004

(65) Prior Publication Data

US 2005/0177857 A1  Aug. 11, 2005

(30) Foreign Application Priority Data

Nov. 26, 2003  (KR)  ............... 10-2003-0084578

(51) Int. Cl.
| | |
|---|---|
| H04N 7/173 | (2006.01) |
| H04N 7/16 | (2006.01) |
| H04B 3/36 | (2006.01) |
| H04B 1/38 | (2006.01) |
| H04M 1/00 | (2006.01) |
| G06F 15/16 | (2006.01) |

(52) U.S. Cl. ............ 725/100; 725/62; 725/86; 725/87; 455/14; 455/556.1; 455/556.2; 455/557; 709/228; 709/229

(58) Field of Classification Search .......... 725/62, 725/86–87, 100; 455/14, 22, 209, 316, 318, 455/572, 557, 566; 709/201, 203, 228, 229
See application file for complete search history.

(56) References Cited

U.S. PATENT DOCUMENTS

| | | | | |
|---|---|---|---|---|
| 6,243,596 | B1* | 6/2001 | Kikinis | ............... 455/572 |
| 6,335,753 | B1* | 1/2002 | McDonald | ............ 348/14.01 |
| 6,377,808 | B1* | 4/2002 | Korneluk et al. | ........ 455/445 |
| 2003/0103518 | A1* | 6/2003 | Han | ............... 370/441 |
| 2004/0204126 | A1* | 10/2004 | Reyes et al. | ............. 455/566 |

* cited by examiner

*Primary Examiner*—John W Miller
*Assistant Examiner*—Gigi L Dubasky
(74) *Attorney, Agent, or Firm*—Roylance, Abrams, Berdo & Goodman, LLP

(57) ABSTRACT

Apparatus and method for multi-tasking in mobile terminal having multimedia processor for video-on-demand (VOD) services that identifies port of each data received during use of VOD service and processes data to enable user to implement any other network application program simultaneously with use of VOD service. Method provided includes setting port number for VOD services of multimedia processor and accessing VOD server when demand for VOD services is received, processing VOD data received through the set port number to deploy VOD services, determining whether port number of data received during VOD services is identical to the set port number. When the port number of the received data is identical to the set port number, recognizing received data as VOD data to deploy VOD services, when not, recognizing received data as general data and sending it to MSM from the multimedia processor, and processing general data sent to the MSM.

12 Claims, 3 Drawing Sheets

METHOD OF MULTI-TASKING IN MOBILE TERMINAL

PRIORITY

This application claims priority under 35 U.S.C. §119(a) to an application entitled "Method of Multi-Tasking in Mobile Terminal" filed with the Korean Intellectual Property Office on Nov. 26, 2003 and assigned Serial No. 2003-84578, the entire contents of which are hereby incorporated by reference.

BACKGROUND OF THE INVENTION

1. Field of the Invention

The present invention relates to a method of multi-tasking in a mobile terminal. More particularly, the present invention relates to a method of multi-tasking in a mobile terminal that identifies a port of each data received during the use of a video-on-demand (VOD) service and processes the data to enable a user to implement any other network application program simultaneously with the use of the VOD service.

2. Description of the Related Art

Due to the development of mobile communication technologies, mobile terminals have been widely supplied and developed to offer various services. Mobile terminals are available for a wide range of applications and are more integrated than pre-existing mobile phones to perform various additional functions. These functions include camera, camcorder and multimedia functions.

Multimedia can be defined as a combination of sound, text, graphics, moving images, and other types of information. The multimedia function enables users to receive VOD services on various multimedia contents, including image data (such as films and music videos), through a wireless network from multimedia servers. VOD services stream the multimedia contents in real-time. For more stable processing of multimedia data, it has been suggested to mount a multimedia chip in a mobile terminal Mobile station modem (MSM) chips in mobile terminals serve as a modem for accessing wireless networks. Multimedia chips process multimedia data (hereinafter referred to as "VOD data") received through the mobile terminal.

Conventional mobile terminals make the best use of wireless network access to speed up wireless network data processing and offer VOD services using a multimedia chip that serves as a multimedia data decoder for VOD. Conventional mobile terminals can accomplish this without lowering the wireless network data processing rate.

The conventional mobile terminal separates protocols for VOD services and processes all data received through a wireless network in the multimedia chip. Thus, while receiving VOD streaming services using the multimedia chip, it cannot implement any other network application program, such as a browser or game download, simultaneously.

SUMMARY OF THE INVENTION

Accordingly, the present invention has been made to solve the above-mentioned problems occurring in the prior art, and an object of the present invention is to provide a method of multi-tasking in a mobile terminal to enable a user to implement other network application programs simultaneously with the use of VOD services by analyzing port information of each data received during the use of VOD services and processing the data according to the port information.

In order to accomplish the above object of the present invention, there is provided a method of multi-tasking in a mobile terminal having a multimedia processor for VOD services, which comprises the steps of setting a port number for the VOD services of the multimedia processor and accessing a VOD server when demand for VOD services is received,; processing VOD data received through the set port number to deploy VOD services, determining whether a port number of data received during the VOD services is identical to the set port number and, in the affirmative, recognizing the received data as the VOD data to deploy the VOD services, and recognizing the received data as general data and sending the data to an MSM from the multimedia processor when the port number of the received data is not identical to the set port number. The method according to an embodiment of the present invention further comprises processing the general data sent to the MSM.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description, a detailed description of known functions and configurations incorporated herein have been omitted for conciseness.

The mobile terminal which will be explained herein is a VOD terminal that supports VOD services. In addition, the term "general data" means all data other than VOD data, which is received through a wireless network.

It is assumed that VOD data and general data are both packet data. The mobile terminal according to an embodiment of the present invention implements multi-tasking by processing general data received through a wireless network during the use of VOD services.

For reasons of conciseness, an explanation of how to send data (signals requesting VOD playback, temporary stop, VOD data, etc.) to a VOD server from a multimedia processor will be omitted herein.

Figure 1:
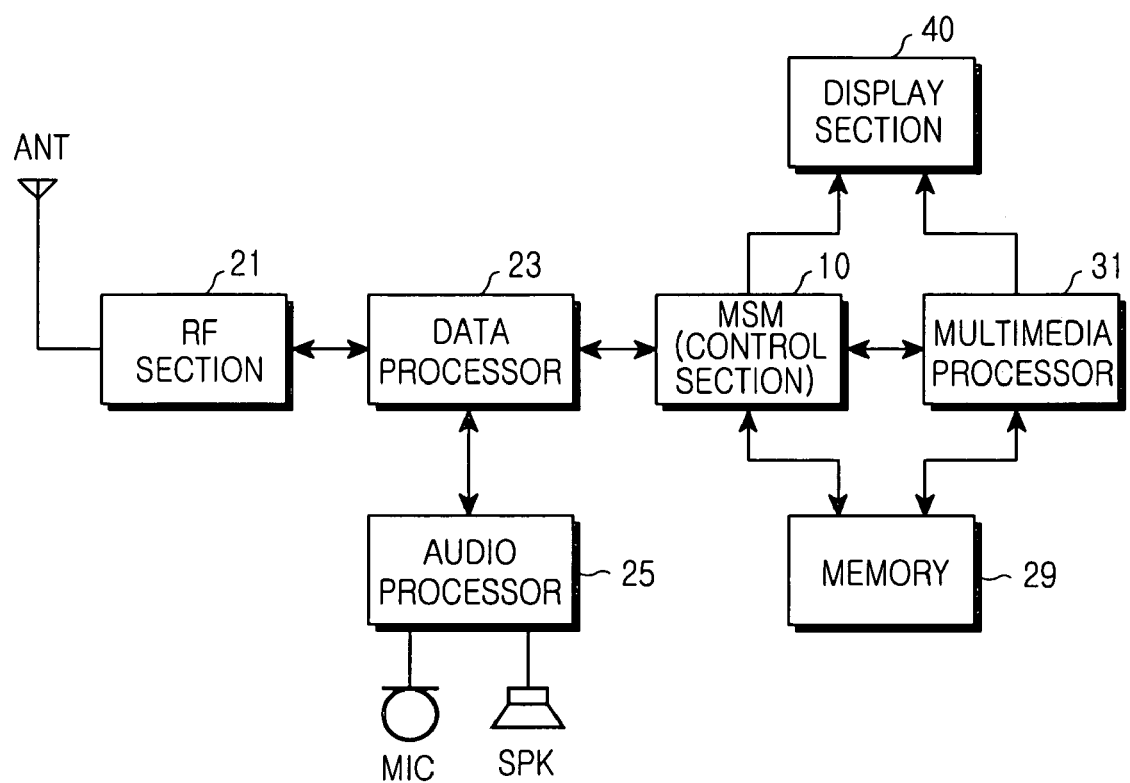
FIG. 1 is a view showing the structure of a multi-tasking mobile terminal according to an embodiment of the present invention.

FIG. 1 shows the structure of a multi-tasking mobile terminal according to an embodiment of the present invention.

Referring to FIG. 1, an RF section 21 performs the wireless communication functions for the mobile terminal. The RF section 21 comprises an RF transmitter for performing upward conversion and amplification of the frequency of a signal that is transmitted, and an RF receiver for amplifying a signal that is received, with low noise and performing downward conversion of the frequency of the signal.

A data processor 23 comprises a transmitter for coding and modulating a signal that is transmitted and a receiver for demodulating and decoding a signal that is received. The data processor 23 can be composed of a modem and a codec.

An audio processor 25 reproduces an audio signal output from the data processor 23, or transmits an audio signal generated from a microphone to the data processor 23. The audio processor 25 also outputs an audio signal included in a real-time VOD data stream to the speaker.

A keypad 27 (not shown) is provided with keys for inputting numbers and characters and function keys for setting up various functions. The key input section 27 can also include a VOD access key, a menu key, a direction key and an OK key according to an embodiment of the present invention.

A memory 29 can be composed of a program memory and a data memory. The program memory stores programs for controlling general operations of the mobile terminal, programs for processing general data received during the processing of VOD data and a port number set to process the VOD data. The data memory temporarily stores data generated during implementation of the above programs.

A multimedia processor 31 processes VOD data received through a wireless network during VOD service. The multimedia processor 31 reads out the port number set in the memory 29 to determine whether any received data is VOD data or general data. When the received data is VOD data, the multimedia processor 31 processes the VOD data through decapsulation in a protocol stack from lower to higher layers.

Otherwise, when general data is received, the multimedia processor 31 encapsulates the data in the protocol stack from a transfer layer (TCP/UDP layer) to the lowest physical layer and transmits the encapsulated data to a control section (hereinafter referred to as mobile station modem (MSM)) 10.

The MSM 10 controls the overall operations of the mobile terminal. The MSM 10 sends general data received upon selection of a multi-tasking menu during a VOD service to the multimedia processor 31. When the multimedia processor 31 determines that a port number of the general data is different from the port number set for VOD services, it inputs the general data again to the MSM 10. The MSM 10 then processes the received general data through decapsulation up to the highest layer, i.e. the WAP layer. When an input from the VOD access key is detected (i.e., when the VOD access key is activated), the MSM 10 assigns a port number for VOD services and outputs the port number to the memory 29. The MSM 10 controls overall operations to process VOD data through a VOD service. At the same time, the MSM 10 receives and processes general data returned from the multimedia processor 31 during use of the VOD service.

In addition, the MSM 10 performs multi-tasking by implementing an application program corresponding to the other general data upon selection of the multi-tasking menu during the VOD service.

A display section 40 displays messages generated during the implementation of a program under control of the MSM 10. The display section 40 also displays user data output from the MSM 10. In addition, the display section 40 displays VOD data output from the multimedia processor 31 and general data output from the MSM 10 simultaneously. The display section 40 can be an LCD comprising an LCD controller, a memory for storing image data and an LCD device. When the LCD is a touch screen, it can serve as an input means (i.e., the keypad 27).

Referring to FIG. 1, if a user (caller) sets an outgoing call mode after dialing using the keypad 27, the MSM 10 will detect the mode and will process the dialing information received through the data processor 23. The MSM 10 converts the dialing information into an RF signal and outputs the RF signal. A reply signal generated from a recipient is detected by the RF section 21 and the data processor 23. The audio processor 25 then forms a voice communication path so that the user can communicate with the recipient. When detecting an incoming call, the MSM 10 controls the audio processor 25 to generate a ringing signal. When the user replies to the incoming call, the MSM 10 detects the reply and controls the audio processor 25 to form a voice communication path so that the user can receive the incoming call. Although voice communications in the incoming or outgoing call mode have been explained above, the MSM 10 can also perform data communications to receive or transmit packet data or image data. In a standby mode or a messaging mode, the MSM 10 displays text data processed by the data processor 23 on the display section 40.

The mobile terminal processes data for multi-tasking to implement an application program corresponding to general data received through a wireless network during a VOD service. If a port number of data analyzed through decapsulation over the protocol layers of the multimedia processor 31 is different from the port number set during the use of the VOD service, the multimedia processor 31 will encapsulate the data down to the lowest protocol layer and will send the encapsulated data to the MSM 10. At this time, the multimedia processor 31 will also send information indicating that the received data is not VOD but general data.

The MSM 10 decapsulates the received general data up to the highest protocol layer and processes the general data using a corresponding application program, thereby performing multi-tasking that simultaneously processes the VOD data at the multimedia processor 31 and the general data at the MSM 10.

Figure 2:
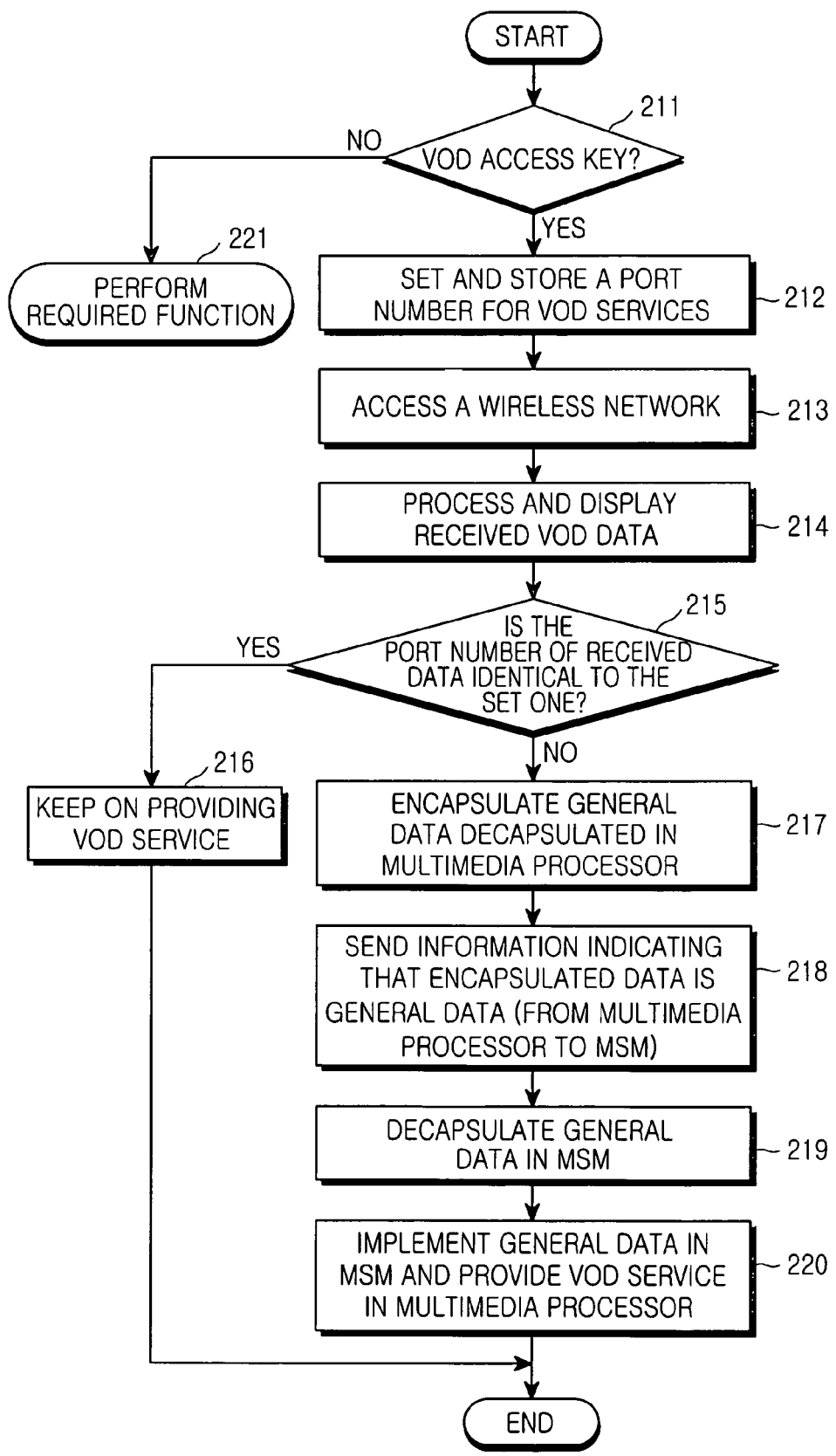
FIG. 2 is a flow chart showing a process of multi-tasking in a mobile terminal according to an embodiment of the present invention.

FIG. 2 is a flow chart illustrating the steps of a method for multi-tasking in a mobile terminal according to an embodiment of the present invention.

Referring to FIG. 2, the MSM 10 in the standby mode detects whether the VOD access key has been activated at decision step 211. If the VOD access key has been activated ("Yes" path from decision step 211), the MSM 10 will proceed to step 212 to independently set a port number to be used for VOD services by the multimedia processor 31 and store the port number in the memory 29. If the VOD access key has not been activated ("No" path from decision step 211), the MSM 10 performs the required function in step 221.

At step 213, the MSM 10 accesses a wireless network. At step 214, the multimedia processor 31 processes VOD data received through the MSM 10 and displays the processed VOD data on the display section 40. The protocol architectures of the MSM 10 and the multimedia processors 31 will be explained in detail with reference to FIG. 3.

Figure 3:
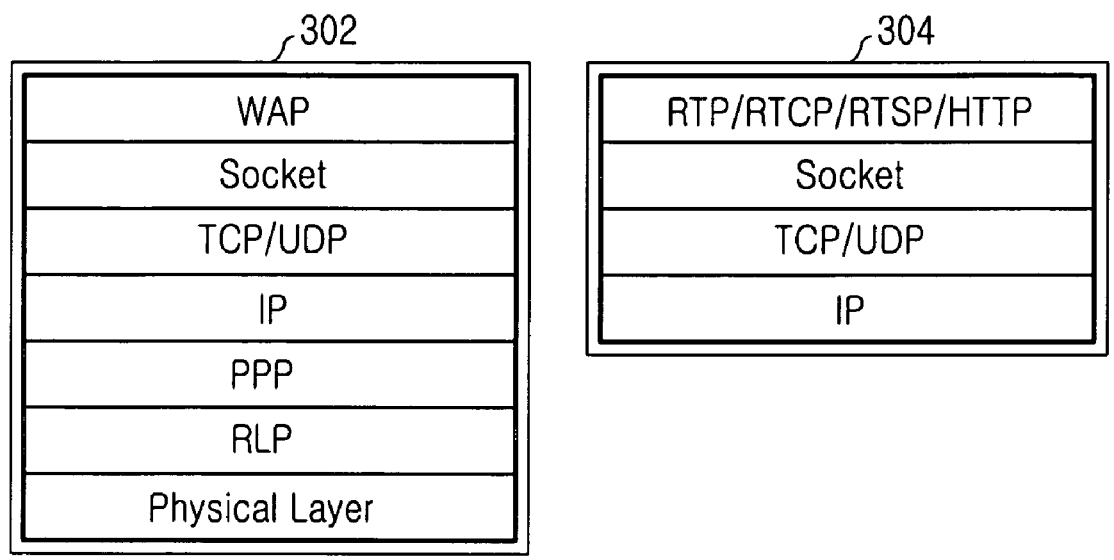
FIG. 3 is a view showing protocol stacks of the MSM and multimedia processor in FIG. 1.

FIG. 3. shows protocol stacks of the MSM and multimedia processor in FIG. 1.

As shown in FIG. 3, MSM 10 protocol stack 302 is comprised of a lowest physical layer, an radio link protocol (RLP) layer, a point-to-point protocol (PPP) layer, an internet protocol (IP) (layer, a transmission control protocol/user datagram protocol (TCP/UDP) layer, a socket layer and a highest wireless application protocol (WAP) layer.

The MSM 10 having the above protocol stack 302 decapsulates received data in each protocol layer and passes the data on to an application program through the highest WAP layer.

Also shown in FIG. 3 is a multimedia processor 31 protocol stack 304 that is comprised of an IP layer, a TCP/UDP layer, a socket layer and an RTP/RTCP/RTSP/HTTP layer. The multimedia processor 31 processes data received from the MSM 10 through a wireless network during use of a VOD service.

The MSM 10 connected to the VOD server through the physical layer processes received VOD data through the RLP and PPP layers and sends the VOD data to the multimedia processor 31. This occurs in step 214. Then the multimedia processor 31 processes the VOD data by passing the data on to the higher layers.

The VOD data is processed along the data processing path as explained above. The user can receive desired VOD data in real-time from the VOD server on a wireless network. While processing the received VOD data, the multimedia processor 31 determines, at decision step 215, whether the port number of the received VOD data that has been analyzed at the TCP/UDP layers is identical to the preset port number. If the port number of the received VOD data is identical to the preset port number ("Yes" path from decision step 215), the multimedia processor 31 will recognize that the received data is VOD data and will keep on deploying VOD services at step 216.

Otherwise, if the port number of the received data is not determined to be identical to the preset one at step 215 ("No" path from decision step 215), the multimedia processor 31 will encapsulate the general data (which has been decapsulated from the protocol layer lower than the TCP/UDP layer) conversely down to the lowest IP layer.

At step 218, the multimedia processor 31 sends the encapsulated general data, as well as information indicating that the received data is not VOD but general data, to the PPP layer of the MSM 10 from its lowest IP layer. At step 219, the MSM 10 decapsulates the received general data over its IP layer through WAP layer. At step 220, the MSM 10 implements the general data. The multimedia processor 31 keeps on processing the VOD data to provide VOD services.

Steps 217 to 220 are general data processing steps for multi-tasking in the mobile terminal. When the user presses a menu key to select the multi-tasking menu in order to use another function through a wireless network during the use of a VOD service, the multimedia processor 31 processes general data corresponding to the other function using the multi-tasking function, thereby implementing the other function simultaneously with the VOD services.

Although FIG. 3 illustrate specific protocol stacks of the MSM 10 and the multimedia processor 31, other protocol stacks can be used in the MSM 10 and the multimedia processor 31. For example, the multimedia processor 31 can have a PPP layer as the lowest layer in its protocol stack, while the other layers are the same as shown in FIG. 3.

In such case, however, the MSM 10 decapsulates received data down to the RLP layer. Also, upon receiving the data from the MSM 10, the multimedia processor 31 decapsulates the data from the lowest PPP layer.

Display of the VOD data and general data on the display section 40 as a result of the multi-tasking function according to an embodiment of the present invention will be explained in detail.

When the user selects either VOD data for a VOD service or general data for another service or function, the selected service data is displayed as a main picture, while the other data is processed as a background. It is also possible to display the general data while processing the VOD data. To accomplish this, the display section 40 is divided into upper and lower parts. The general data and the VOD data can be displayed respectively at the upper and lower parts of the display section 40, and vice versa. Accordingly, both data can be displayed simultaneously. Therefore, various methods are available to simultaneously display general data and VOD data processed through multi-tasking.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method of multi-tasking in a mobile terminal having a multimedia processor for video on demand (VOD) services, which comprises the steps of;

setting and allocating a port number for the VOD services of the multimedia processor through access to a VOD server when a demand for VOD services is received;

processing VOD data received through the set port number to deploy VOD services;

determining whether a port number of data received during the VOD services is identical to the set port number and, if in the affirmative, recognizing the received data as the VOD data and thereby deploying the VOD services;

recognizing the received data as general data and sending the general data to a mobile station modem (MSM) from the multimedia processor when the port number of the received data is not identical to the set port number; and processing the general data prior to being sent to the MSM, wherein, the deploying of the VOD services is performed essentially simultaneously with the processing of the general data in the MSM.

2. The method of multi-tasking as claimed in claim 1, wherein the step of deploying VOD services comprises:

receiving data decapsulated in the MSM down to a PPP layer; and decapsulating the data in the multimedia processor up through an IP layer, a TCP/UDP layer, a socket layer and an RTP/RTCP/RTSP/HTTP layer to process the VOD data.

3. The method of multi-tasking as claimed in claim 1, wherein the step of deploying the VOD services further comprises:

receiving data decapsulated in the MSM down to an RLP layer; and decapsulating the data in the multimedia processor up through a PPP layer, an IP layer, a TCP/UDP layer, a socket layer and an RTP/RTCP/RTSP/HTTP layer to process the VOD data.

4. The method of multi-tasking as claimed in claim 1, wherein the general data decapsulated in the multimedia processor is encapsulated down to a lowest IP layer of the multimedia processor and sent to the MSM.

5. The method of multi-tasking as claimed in claim 1, wherein the general data encapsulated in the multimedia processor down to a lowest IP layer and sent to the MSM is processed in the MSM through decapsulation from an IP layer to a WAP layer.

6. The method of multi-tasking as claimed in claim 1, further comprising the steps of:

dividing a display section into upper and lower parts and simultaneously displaying the VOD data and general data at each of the upper and lower part on the display section.

7. A mobile terminal capable of multi-tasking comprising:

a mobile station modem (MSM) adapted to received general data; and a multimedia processor for VOD services adapted to set and allocate a port number for the VOD services of the multimedia processor through access to a VOD server when a demand for VOD services is received, process VOD data received through the set port number to deploy VOD services, determine whether a port number of data received during the VOD services is identical to the set port number and, if in the affirmative, recognizing the received data as the VOD data and thereby deploying the VOD services, recognize the received data as general data and send the data to an MSM from the multimedia processor when the port number of the received data is not identical to the set port number; and process the general data prior to being sent to the MSM, wherein the deploying of the VOD services is performed essentially simultaneously with the processing of the general data in the MSM.

8. The mobile terminal capable of multi-tasking as claimed in claim 7, further comprising:

the multimedia processor further adapted to receive data decapsulated in the MSM down to a PPP layer; and the MSM further adapted to decapsulate the data in the multimedia processor up through an IP layer, a TCP/UDP layer, a socket layer and an RTP/RTCP/RTSP/HTTP layer to process the VOD data.

9. The mobile terminal capable of multi-tasking as claimed in claim 7, wherein the multimedia processor further comprises:

the multimedia processor being further adapted to receive data decapsulated in the MSM down to an RLP layer and to decapsulate the data in the multimedia processor up through a PPP layer, an IP layer, a TCP/UDP layer, a socket layer and an RTP/RTCP/RTSP/HTTP layer to process the VOD data.

10. The mobile terminal capable of multi-tasking as claimed in claim 7, wherein the general data decapsulated in said multimedia processor is encapsulated down to a lowest IP layer of the multimedia processor and sent to the MSM.

11. The mobile terminal capable of multi-tasking as claimed in claim 7, wherein said general data encapsulated in the multimedia processor down to a lowest IP layer and sent to the MSM is processed in the MSM through decapsulation from an IP layer to a WAP layer.

12. The mobile terminal capable of multi-tasking as claimed in claim 7, further comprising;

a display section, wherein the display section is divided into upper and lower parts and simultaneously displays the VOD data and general data at each of the upper and lower part on the display section.

* * * * *